United States Patent
Shimoi et al.

(10) Patent No.: US 8,980,400 B2
(45) Date of Patent: Mar. 17, 2015

(54) LIGHT-SCATTERING FLUORORESIN FILM FOR AGRICULTURAL APPLICATIONS, AND METHOD FOR PRODUCING SAME

(75) Inventors: Yasuko Shimoi, Tokyo (JP); Hiroshi Aruga, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 596 days.

(21) Appl. No.: 13/090,423

(22) Filed: Apr. 20, 2011

(65) Prior Publication Data

US 2011/0195227 A1    Aug. 11, 2011

Related U.S. Application Data

(63) Continuation of application No. PCT/JP2009/068081, filed on Oct. 20, 2009.

(30) Foreign Application Priority Data

Oct. 21, 2008 (JP) ................... 2008-271050

(51) Int. Cl.
  *B32B 5/16* (2006.01)
  *A01G 9/14* (2006.01)

(52) U.S. Cl.
  CPC .................... *A01G 9/1438* (2013.01)
  USPC ........... 428/141; 428/143; 428/150; 428/324; 47/29.1; 47/17

(58) Field of Classification Search
  USPC ......... 428/141, 143, 144, 145, 221, 323, 324, 428/332, 339; 47/29.1, 17
  See application file for complete search history.

(56) References Cited

U.S. PATENT DOCUMENTS

| 5,599,489 | A | * | 2/1997 | Saiki et al. ................. 264/83 |
| 2003/0156238 | A1 | | 8/2003 | Hiraishi et al. |
| 2004/0196558 | A1 | | 10/2004 | Takahashi et al. |
| 2006/0057343 | A1 | | 3/2006 | Tsuji et al. |
| 2006/0127643 | A1 | * | 6/2006 | Nun et al. ................. 428/143 |
| 2010/0021739 | A1 | | 1/2010 | Aruga et al. |
| 2011/0105662 | A1 | | 5/2011 | Aruga et al. |

FOREIGN PATENT DOCUMENTS

| JP | 8-51871 | 2/1996 |
| JP | 10-292056 | 11/1998 |

(Continued)

OTHER PUBLICATIONS

Japanese Machine Translation of JP 10-292056. Nov. 4, 1998.*

(Continued)

*Primary Examiner* — Maria Veronica Ewald
*Assistant Examiner* — Nancy Johnson
(74) *Attorney, Agent, or Firm* — Oblon, McClelland, Maier & Neustadt, L.L.P.

(57) ABSTRACT

The present invention provide a light-scattering fluororesin film for agricultural applications which can be used as a covering material for an agricultural house or the like, is excellent in uniformity of color or the like of crops cultivated, can reduce the occurrence of leaf scorch, seedling blight or the like, and can cultivate the crops at high productivity. Specifically, the invention provides a light-scattering fluororesin film for agricultural applications that gives a ratio of scattered light with a scattering angle of 5.5 to 10° being 5% or higher relative to the total transmitted light.

19 Claims, 1 Drawing Sheet

(56) References Cited

FOREIGN PATENT DOCUMENTS

| | | |
|---|---|---|
| JP | 11-60838 | 3/1999 |
| JP | 2000-139244 | 5/2000 |
| JP | 2002-69258 | 3/2002 |
| JP | 2006-75047 | 3/2006 |
| JP | 2006-115838 | 5/2006 |
| JP | 2006-248043 | 9/2006 |

OTHER PUBLICATIONS

International Search Report issued Jan. 26, 2010 in PCT/JP09/068081 filed Jan. 19, 2010.

The Extended European Search Report issued Mar. 12, 2012, in Application No. / Patent No. 09822035.3-1260 / 2351481 PCT/JP2009068081.

\* cited by examiner

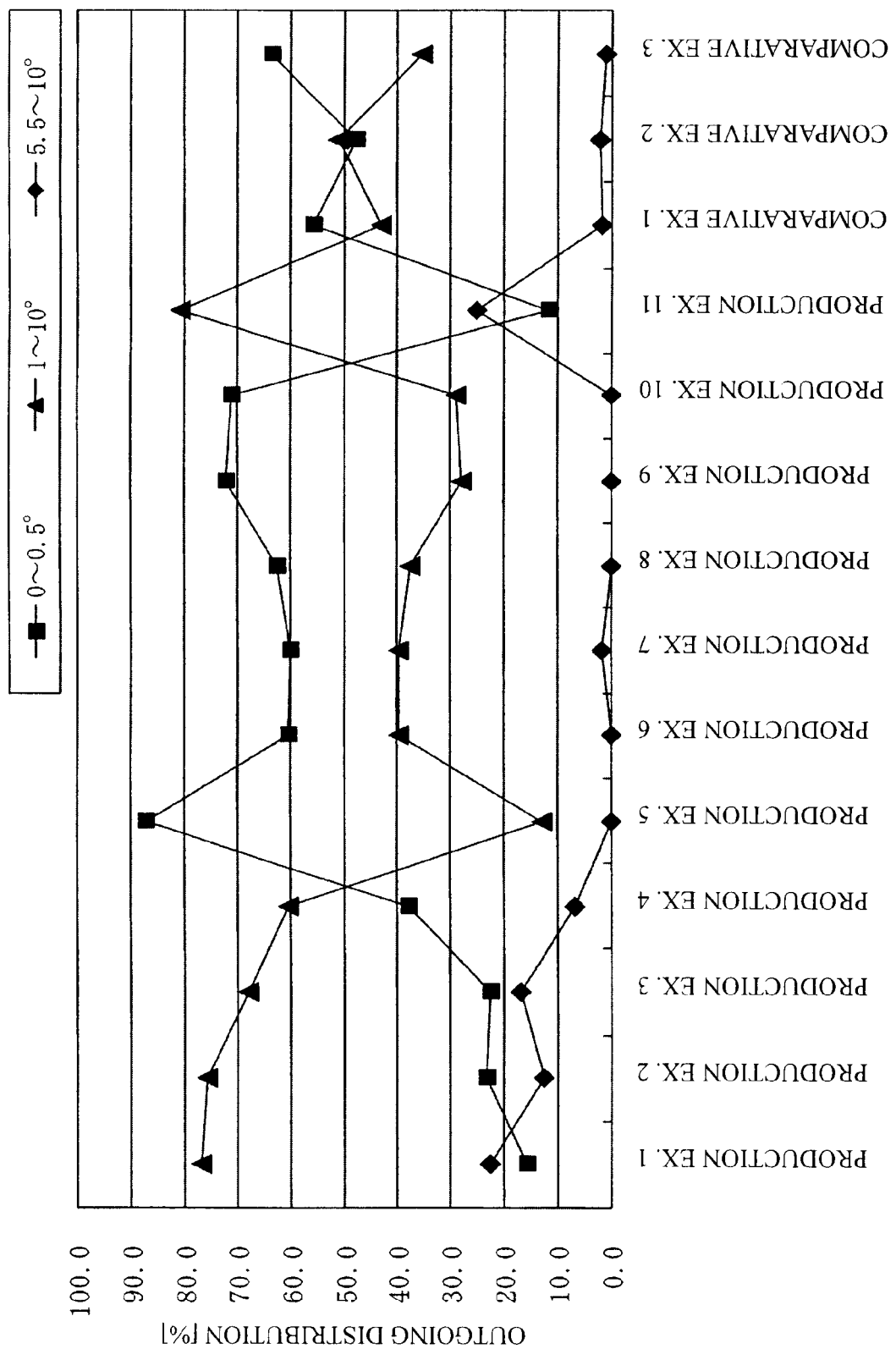

LIGHT-SCATTERING FLUORORESIN FILM FOR AGRICULTURAL APPLICATIONS, AND METHOD FOR PRODUCING SAME

TECHNICAL FIELD

The present invention relates to a light-scattering fluororesin film for agricultural applications, and a method for producing the same.

BACKGROUND ART

Covering materials for agricultural houses and the like are required to be excellent in transparency and to have no changes in strength and transmittance of visible light even in outdoor exposure over a period of 10 years or longer. Therefore, fluororesin films represented by ETFE (ethylene-tetrafluoroethylene copolymer) have been widely used.

In agricultural house cultivation, scattering properties of transmitted light through the film of the agricultural house have influences on improvements in color, sugar content and yield depending on the kind of fruit, flower or vegetable, or on prevention of disease occurrence. That is to say, when, among the light transmitted through the film, much light is directly transmitted, there has sometimes occurred leaf scorch caused by direct sunlight or seedling blight due to a rapid increase of the internal temperature of the house. Further, because of decreased scattered light, shadow areas by crops or frames such as supports of the house increases. Accordingly, crops in the shadow areas show poor growth, give irregularity in color, or show a growth rate deviated from that of the crops in sunny areas. It has therefore become difficult to control cultivation and harvest times.

Methods for solving these problems include a method of allowing light transmitted through the film as the covering material to be scattered. Patent Document 1 shows a method of dispersing composite particles comprising silica, talc, and mica into a fluororesin to allow light to be scattered. Further, Patent Document 2 shows a method of providing a concavo-convex rough surface on at least one surface of a film to allow light to be scattered.

CITATION LIST

Patent Document

Patent Document 1: JP-A-10-292056
Patent Document 2: JP-A-8-51871

SUMMARY OF THE INVENTION

Problems to be Solved by the Invention

However, the relationships between the scattering properties of light transmitted through the films, and the improvements in color, sugar content and yield of the crops and the prevention of disease occurrence have not been completely elucidated yet. Therefore, even when the films of Patent Documents 1 and 2 are used, crops which are poor in color or sugar content have been obtained in some part of the house or diseases have occurred, in some cases. Further, in the method of Patent Document 2, when the amount of fine particles added is excessively increased for the purpose of increasing scattered light, the light transmittance of the film has been decreased in some cases.

An object of the present invention is to provide a light-scattering fluororesin film for agricultural applications which is a film capable to be used as a covering material for an agricultural house or the like, in which the film can reduce the occurrence of leaf scorch, seedling blight or the like, and can cultivate crops excellent in uniformity of color or the like at high productivity.

Means for Solving the Problems

The present invention provides a light-scattering fluororesin film for agricultural applications and a method for manufacturing the same having the following content.

[1] A light-scattering fluororesin film for agricultural applications that gives a ratio of scattered light with a scattering angle of 5.5 to 10° being 5% or higher relative to the total transmitted light.

[2] The light-scattering fluororesin film for agricultural applications according to [1] that gives a ratio of scattered light with a scattering angle of 1 to 10° being 50% or higher relative to the total transmitted light.

[3] The light-scattering fluororesin film for agricultural applications according to [1] or [2] that gives a ratio of scattered light with a scattering angle of 30° or larger being 1% or lower relative to the total transmitted light.

[4] The light-scattering fluororesin film for agricultural applications according to any one of [1] to [3], wherein the fluororesin film has concaves and convexes on a surface thereof, and has a surface roughness thereof represented by the arithmetic average roughness Ra of from 1.6 µM to 3 µm, in both the TD direction (width direction) and the MD direction (flow direction).

[5] The light-scattering fluororesin film for agricultural applications according to any one of [1] to [4], wherein the fluororesin film has concaves and convexes on a surface thereof, and has a surface roughness thereof represented by the 10-point average roughness Rz of from 13 to 25 µm, in both the TD direction and the MD direction.

[6] The light-scattering fluororesin film for agricultural applications according to any one of [1] to [5], wherein the fluororesin film has concaves and convexes on a surface thereof, and has an average distance Sm among the concaves and the convexes of from 40 to 100 µm, in both the MD direction and the TD direction.

[7] The light-scattering fluororesin film for agricultural applications according to any one of [1] to [6], wherein the fluororesin film contains synthetic mica particles having an average particle size of 3 to 15 µm, and the content thereof is from 3 to 5 parts by mass based on 100 parts by mass of the fluororesin.

[8] A method for manufacturing the light-scattering fluororesin film for agricultural applications having a concavo-convex pattern on a surface thereof according to any one of [4] to [7], comprising a step of extruding a fluororesin through a die using an extruder and a step of holding the extruded film between a mirror-surface casting roll and a concavo-convex pattern-embossed back roll to cool and solidify it.

ADVANTAGES OF THE INVENTION

The light-scattering fluororesin film for agricultural applications of the present invention is a film capable to be used as a covering material for an agricultural house or the like, in which the film can reduce the occurrence of leaf scorch, seedling blight or the like, and can cultivate crops excellent in uniformity of color or the like at high productivity.

BRIEF DESCRIPTION OF THE DRAWING

FIG. 1 is a view showing outgoing distributions of transmitted light through the fluororesin films of Manufacturing Examples 1 to 11 and the agricultural films of Reference Examples 1 to 3.

MODE FOR CARRYING OUT THE INVENTION

[Light-Scattering Fluororesin Film for Agricultural Applications]

The light-scattering fluororesin film for agricultural applications of the present invention (hereinafter merely referred to as the "fluororesin film" in some cases) is a film which can be used as a covering material for an agricultural house or the like, and a fluororesin is used as a base material.

The fluororesins used as the base material include, for example, polyvinylidene fluoride, polytetrafluoroethylene, polychlorotrifluoroethylene, polyhexafluoropropylene, polyvinyl fluoride, a vinylidene fluoride-tetrafluoroethylene-hexafluoropropylene copolymer, a vinylidene fluoride-hexafluoropropylene copolymer, an ethylene-tetrafluoroethylene copolymer (ETFE), a tetrafluoroethylene-hexafluoropropylene copolymer and a perfluoro(alkyl vinyl ether)-tetrafluoroethylene copolymer. Above all, preferred are ETFE, a tetrafluoroethylene-hexafluoropropylene copolymer and a perfluoro(alkyl vinyl ether)-tetrafluoroethylene copolymer, and particularly preferred is ETFE.

Although the number average molecular weight of the fluororesin is not particularly limited, it is preferably from 10,000 to 1,000,000, and more preferably from 100,000 to 700,000. When the number average molecular weight of the fluororesin is 10,000 or higher, the strength of the film is more increased. When the number average molecular weight of the fluororesin is 1,000,000 or lower, the film is more excellent in molding processability.

Although there is no particular limitation on the thickness of the fluororesin film, it is preferably from 10 to 500 µm, and more preferably from 20 to 200 µm, as the covering material for agricultural house. When the thickness is 10 µm or more, the physical strength such as tearing strength tends to become a sufficient strength as the covering material for agricultural house. Further, when the thickness is 500 µm or less, a sufficient light transmittance is easily obtained.

The fluororesin film of the present invention is a film for agricultural applications, so that the transmittance of the total light transmitted through the film is preferably 85% or higher.

Further, in the fluororesin film of the present invention, the ratio of scattered light with a scattering angle of 5.5 to 10° is 5% or higher, preferably 10% or higher and more preferably 20% or higher relative to the total transmitted light. When the ratio of scattered light with a scattering angle of 5.5 to 10° is 5% or higher, the occurrence of diseases such as leaf scorch and seedling blight can be reduced, and further, crops excellent in uniformity of color or sugar content can be cultivated at high productivity. Incidentally, although the upper limit of the ratio of scattered light with a scattering angle of 5.5 to 10° is not particularly limited, it is preferably 40% or lower.

In this connection, the scattered light in the present invention means light transmitted through the film and scattered. Further, the scattering angle is an angle between a travelling direction of the incident light entering the film and a travelling direction of the scattered light.

In the cultivation of crops in agricultural house, when light transmitted through the film is not very scattered and much light is directly transmitted, shadow areas have been formed in the house by frames, or the temperature in the house has been rapidly increased, in some cases. Therefore, in the crops cultivated in house, defects such as the occurrence of diseases, the occurrence of irregularity in color or sugar content and deviation in growth rate have occurred. Further, lower leaves of the crops in house are under shadows of uppermost leaves of the crops, so that it is said that 80% or more of the total amount of photosynthesis is performed by 2 or 3 pieces of the uppermost leaves.

According to the fluororesin film of the present invention, because the ratio of scattered light with a scattering angle of 5.5 to 10° is 5% or higher, the shadow areas caused by the frames can be prevented from being formed in the house, the uniformity of the color or sugar content of the crops is improved, and the diseases caused by direct sunray are also inhibited. Further, although the amount of light reaching the uppermost leaves is decreased compared to the case where much light is directly transmitted, light can be allowed to sufficiently reach the lower leaves of the crops in the house. Accordingly, as a result, the photosynthetic amount of the whole crops is increased to improve productivity of the crops.

Conventionally, the relationships of the scattered light in the covering material for the agricultural house with the color, sugar content and yield of crops and with the degree of disease occurrence have not been known in detail, and also regarding the ratio of scattering sources, only evaluation by the haze value has been performed. In studies in the present invention, a scattering angle measurement with an automatic variable-angle photometer has been conducted, and the influence of the scattered light having a specific scattering angle on the crops cultivated in the house has been examined, whereby it has been found that the scattered light having a scattering angle of 5.5 to 10° is particularly important for improvement of the color, sugar content and yield of the crops and reduction in the disease occurrence.

Further, in the fluororesin film, the ratio of scattered light with a scattering angle of 1 to 10° relative to the total transmitted light transmitted through the film is preferably 50% or higher, more preferably 60% or higher, and most preferably 70% or higher. When the ratio of the scattered light with a scattering angle of 1 to 10° is 50% or higher, sufficient light is easily allowed to uniformly reach the crops cultivated in the house in a state where the ratio of the directly transmitted light is suppressed. Accordingly, the occurrence of diseases such as leaf scorch and seedling blight is reduced, and it becomes easy to cultivate the crops excellent in uniformity of the color or sugar content, at high productivity. Incidentally, although the upper limit of the ratio of the scattered light with a scattering angle of 1 to 10° is not particularly limited, it is preferably 90% or lower.

Furthermore, in the fluororesin film, the ratio of scattered light with a scattering angle of 30° or lager relative to the total transmitted light transmitted through the film is preferably 1% or lower. When the ratio of the scattered light with a scattering angle of 30° or lager is 1% or lower, the light which has been transmitted through the film and has entered the inside of the house is inhibited from going out as it is because of its extremely large scattering angle. Thus, it becomes easy to allow sufficient light to reach the crops in the house.

In addition, in the fluororesin film, the ratio of the directly transmitted light (light having a scattering angle of 0 to 0.5°) relative to the total transmitted light transmitted through the film is preferably 40% or lower and more preferably 30% or lower. When the ratio of the scattered light with a scattering angle of 0 to 0.5° is 40% or lower, it is easy to inhibit the shadow areas from being formed in the house by the frames or the temperature in the house from being rapidly increased.

Accordingly, the reduction in diseases of the crops, the improvement in uniformity of the color or sugar content and productivity become easy.

In the fluororesin film of the present invention, embodiments for scattering the light transmitted through the film include an embodiment in which the film surface is roughened to a concavo-convex pattern, an embodiment in which a light-scattering agent is contained in the fluororesin for forming the film, and an embodiment combined thereof.

(Roughening of Film Surface to Concavo-Convex Pattern)

When the surface of the fluororesin film is roughened to a concavo-convex pattern, the surface roughness thereof in terms of Ra (arithmetic average roughness) is preferably from 1.6 to 3 µm, more preferably from 1.7 to 3 µm, and most preferably from 1.8 to 2.5 µm, in both the TD direction (width direction) and the MD direction (flow direction). When the Ra is 1.6 µm or larger, there is easily obtained the fluororesin film in which the ratio of the scattered light with a scattering angle of 5.5 to 10° relative to the total transmitted light transmitted through the film is 5% or higher. Further, when the Ra is 1.7 µm or larger, there is easily obtained the fluororesin film in which the ratio of the scattered light with a scattering angle of 5.5 to 10° is 5% or higher and the ratio of the scattered light with a scattering angle of 1 to 10° is 50% or higher relative to the total transmitted light transmitted through the film. Furthermore, when the Ra is 3 µm or smaller, it becomes easy to adjust the ratio of the scattered light with a scattering angle of 30° or lager relative to the total transmitted light transmitted through the film to 1% or lower.

Further, Rz (10-point average roughness) of the fluororesin film is preferably from 13 to 25 µm, more preferably from 15 to 25 µm, and still more preferably from 18 to 22 µm, in both the TD direction and the MD direction. When the Rz is 13 µm or larger, there is easily obtained the fluororesin film in which the ratio of the scattered light with a scattering angle of 5.5 to 10° is 5% or higher and the ratio of the scattered light with a scattering angle of 1 to 10° is 50% or higher relative to the total transmitted light transmitted through the film. Furthermore, when the Rz is 25 µm or smaller, it becomes easy to adjust the ratio of the scattered light with a scattering angle of 30° or larger relative to the total transmitted light transmitted through the film to 1% or lower.

In addition, there is a tendency that the higher the above-mentioned Ra and Rz values are, the smaller the Sm (average distance among concaves and convexes) formed on the surface of the fluororesin film becomes, and the Sm is preferably from 40 to 100 µm, more preferably from 50 to 95 µm, and still more preferably from 60 to 90 µM, in both the TD direction and the MD direction. When the Sm is 40 µm or larger, the film surface comes closer to smoothness, and the scattered light is easily prevented from being excessively increased. Further, when the Sm is 100 µm or smaller, the ratio of the scattered light with a scattering angle of 5.5 to 10° and the ratio of the scattered light with a scattering angle of 1 to 10°, relative to the total transmitted light transmitted through the film, are easily increased.

The RA, Rz and Sm referred to in the present invention mean values measured according to JIS B 0601 (2001). Further, these RA, Rz and Sm can be measured with a contact needle surface roughness tester (Surf-Coder SE-30H manufactured by Kosaka Laboratory Co., Ltd.) or the like.

(Inclusion of Light-Scattering Agent)

The fluororesin film of the present invention may be one in which the light transmitted through the film is allowed to be scattered by allowing a light-scattering agent to be contained.

As the light-scattering agent, there can be appropriately used, for example, a commercially available product such as silica, talc, and mica. As the light-scattering agent, synthetic mica particles are preferred from the view point that they do not excessively decrease the total light transmittance of the fluororesin film and can inhibit deterioration of the fluororesin. The synthetic micas include such as potassium tetra-silicic mica represented by $KMg_{2.5}Si_4O_{10}F_2$, which is synthesized by the solid phase reaction of talc represented by $Mg_3Si_4O_{10}(OH)_2$ and potassium silicofluoride represented by $K_2SiF_6$.

When the synthetic mica particles are used as the light-scattering agent, the average particle size thereof is preferably from 3 to 15 µm, and more preferably from 6 to 10 µm. When the average particle size of the synthetic mica particles is 3 µm or larger, it becomes easy to obtain a sufficient light transmittance even by more decreasing the amount thereof added because light-scattering ability becomes higher. When the average particle size of the synthetic mica particles is 15 µm or smaller, the synthetic mica particles are exposed on the fluororesin film surface to tend to inhibit good contamination resistance as the property of the fluororesin film itself from being impaired.

The above-mentioned average particle size means a value of the particle size at a point where the accumulated volume becomes 50% on an accumulated curve determined by measuring a particle size distribution by a laser diffraction scattering method and taking the total volume of groups of the particles as 100%, namely, the 50% diameter (accumulated median diameter). As a measuring apparatus, there can be used, for example, a microtrack particle size distribution measuring apparatus (manufactured by Nikkiso Co., Ltd, product name: HRA X-100).

The content of the synthetic mica particles is preferably from 3 to 5 parts by mass based on 100 parts by mass of the fluororesin which forms the fluororesin film. When the content of the synthetic mica particles is 3 parts by mass or more, the ratio of the scattered light with a scattering angle of 5.5 to 10° relative to the total transmitted light transmitted through the film is easily improved. Further, when the content of the synthetic mica particles is 5 parts by mass or less, the synthetic mica particles are exposed on the fluororesin film surface to tend to inhibit good contamination resistance as the property of the fluororesin film itself from being impaired.

When the synthetic mica particles are allowed to be contained in the fluororesin film, it is preferred that the synthetic mica particles and a treating agent having a function of hydrophobizing the surfaces of the particles are allowed to be contained. It is not so difficult to disperse the synthetic mica particles having an average particle size of 3 µm or larger into the fluororesin. However, by allowing the above-mentioned treating agent to exist on the surfaces of the synthetic mica particles, in a compounding step of the fluororesin and the synthetic mica particles, or in a film manufacture process, dispersibility of the synthetic mica particles is improved, and it becomes easy to inhibit coloring of the fluororesin.

As the treating agent, preferred is an alkyl group-containing silane coupling agent or silicone compound. The silane coupling agents include, for example, isobutyltrimethoxysilane and hexyltrimethoxysilane. The silicone compounds include such as dimethyl silicone oil and phenyl methyl silicone oil. Commercial products can also be used as all of these.

As described above, the fluororesin film of the present invention may be one in which the ratio of the scattered light with a scattering angle of 5.5 to 10° is adjusted to 5% or higher relative to the total transmitted light transmitted through the film by forming the film from the fluororesin in which the light-scattering agent and, as needed, the treating agent having a function of hydrophobizing the surface of the light-scattering agent are allowed to be contained, and roughening the surface of the film to a concavo-convex pattern.

Known additives may be contained in the fluororesin film of the present invention, as needed. The additives include, for example, inorganic ultraviolet absorbers such as cerium oxide, zinc oxide and iron oxide, and commercially available organic ultraviolet absorbers.

The fluororesin film of the present invention may be subjected to such aftertreatment as to be usually performed for agricultural films. For example, after the fluororesin film is subjected to corona discharge treatment, inorganic fine particles such as silica fine particles or alumina fine particles may be adhered to the treated surface. In order to allow the inorganic fine particles to be firmly adhered to the film surface, an anti-water dripping agent, which is mainly composed of a silane coupling agent, may be applied to the film to a thickness of about 0.3 μm, as needed.

The fluororesin film of the present invention is for agricultural applications, and preferably used for horticultural houses and agricultural houses. In particular, the film can be used for cultivation of crops which dislike direct sunlight, such as melons, crops to which coloring is desired, such as tomatoes and strawberries, further, seedlings which dislike rapid changes in temperature, and the like.

The fluororesin film of the present invention described above provides conditions in which the ratio (outgoing distribution) of the directly transmitted light and the scattered light is optimum for cultivating crops in agricultural houses. That is to say, direct sunlight is softened, thereby being able to reduce leaf scorch and seedling blight of plants. Further, shadows caused by the frames of the agricultural house become difficult to be formed, thereby being able to prevent partial poor growth of the crops. Furthermore, the light is uniformly irradiated on the crops, so that the yield of the crops is improved, and moreover, the harvest ratio of high-grade crops is also improved.

(Manufacturing Method)

An example of a manufacturing method of the fluororesin film of the present invention will be described below.

Molding methods of the fluororesin film include a method of subjecting the fluororesin to melt extrusion film molding. There is no particular limitation on the melt extrusion film molding method, and there are included, for example, a T-die type extrusion method using a single screw extruder or a multiple screw extruder, an inflation method, and a calendering method. The T-die type extrusion method is preferred in terms of uniformity of the thickness of the film formed.

In the present invention, methods for roughening the surface of the fluororesin film to a concavo-convex pattern include, for example, a method of extruding the fluororesin from a die using a single screw extruder or a multiple screw extruder and casting the film on a casting roll which is embossed to a concavo-convex pattern, or holding the extruded film between a mirror-surface casting roll and a back roll which is embossed to a concavo-convex pattern to cool and solidify it. The extruding temperature of the fluororesin is preferably from 200 to 350° C.

As described above, the method of roughening the surface to a concavo-convex pattern at the time of film molding can be performed continuously from the extrusion of the resin to the embossing, so that it is excellent in productivity.

When the surface is roughened to a concavo-convex pattern at the time of film molding, the RA, Rz and Sm of the film are adjusted by appropriately adjusting molding conditions such as die temperature, air gap, take-over speed and casting roll temperature, thereby being able to obtain the fluororesin film having the above-mentioned optical properties.

Further, the roughening of the surface of the film to a concavo-convex pattern may be performed by embossing after the film molding. In this case, an embossing method is not particularly limited, and a known method can be applied. There are included, for example, a method of performing roughening treatment by polishing the film surface by sandblast or the like, and a method of holding the film between a roll whose surface is embossed to a concavo-convex pattern and a touch roll.

When the above-mentioned scattering agent, treating agent, additives and the like are allowed to be contained in the fluororesin film, there is mentioned a method of preparing a fluororesin mixture in which they are incorporated, and thereafter, molding the mixture into a film form by the above-mentioned melt extrusion film molding method. Also in this case, the melt extrusion film molding method is preferably the T-die type extrusion method in terms of uniformity of the thickness and planarity of the film formed. Further, even when the surface is roughened to a concavo-convex pattern, the above-mentioned roughening method can be used.

Furthermore, as an aftertreatment after the film molding, the film is subjected to the corona discharge treatment, and thereafter, inorganic fine particles such as silica fine particles or alumina fine particles may be imparted to the treated surface, or in order to allow the inorganic fine particles to be firmly adhered to the film surface, the agent for flowing water droplets, which is mainly composed of the silane coupling agent, may be applied to the film to a thickness of about 0.3 μm.

EXAMPLES

Hereinafter, the present invention will be described in detail by showing Examples and Comparative Examples, but the invention is not limited by the following description. Incidentally, Production Examples 1 to 4 and 11 are Examples, and Production Examples 5 to 10 are Comparative Examples.

<Evaluation of Fluororesin Film>

The fluororesin films obtained in Examples were evaluated by total light transmittance, haze (opacity), parallel light transmittance, outgoing distribution of transmitted light and surface roughness which are shown below. Further, a light source used for the evaluations is based on JIS Z8720 (2001) and is a standard light distributing from 300 to 830 nm.

[Measurement of Total Light Transmittance, Haze (Opacity) and Parallel Light Transmittance]

For the fluororesin films, total light transmittance (unit: %), haze (opacity, unit: %) and parallel light transmittance (unit: %) were measured according to JIS K7105 "Optical Characteristic Test Method of Plastics" (2001) using a color computer (manufactured by Suga Test Instruments Co., Ltd., MS-5).

[Measurement of Outgoing Distribution of Transmitted Light]

Outgoing distribution of the light transmitted through the fluororesin film was determined by measuring the relative transmittance of outgoing distribution at the time when the light perpendicularly enters the film surface, with an automatic variable-angle photometer (GONIO-PHOTOMATER) (manufactured by Murakami Color Research Laboratory Co., Ltd, GP-1R) for every 0.5° within the range of 0 to 60°.

[Measurement of Surface Roughness]

For surface roughness of the fluororesin films, the Ra (arithmetic average roughness), the Rz (10-point average roughness) and the Sm (average distance among concaves and convexes) were each measured with a contact needle surface roughness tester (Surf-Coder SE-30H manufactured by Kosaka Laboratory Co., Ltd.) according to JIS B 0601 (2001).

<Manufacture of Fluororesin Films>

Production Example 1

As a fluororesin, there was used ETFE (manufactured by Asahi Glass Co., Ltd., product name: Fluon ETFE C-88AX). A surface-embossed fluororesin film having a thickness of 100 μm was manufactured by a T-die type extrusion molding method using a surface-embossed back roll. As for molding conditions, the die temperature was adjusted to 330° C., the air gap to 50 mm, the first roll temperature to 120° C., the second roll (emboss roll) temperature to 90° C., and the take-over speed to 7 m/min.

Production Example 2

A surface-embossed fluororesin film having a thickness of 100 μm was manufactured in the same manner as in Production Example 1 with the exception that the take-over speed was changed to 6 m/min.

Production Example 3

As a fluororesin, there was used ETFE (manufactured by Asahi Glass Co., Ltd., product name: Fluon ETFE C-88AX). Five parts by mass of synthetic mica (manufactured by CO-OP Chemical Co., Ltd., product name: MK200, average particle size: 6.2 μm) and 0.1 part by mass of phenyl methyl silicone oil (manufactured by Dow Corning Toray Co., Ltd., product name: SH510) were incorporated in 100 parts by mass of the fluororesin, followed by compounding using a twin screw extruder to produce pellets. Thereafter, using the pellets, a fluororesin film having a thickness of 80 μm was manufactured under the same conditions as in Production Example 1 by a T-die type extrusion molding method using no surface-embossed back roll at the time of film molding.

Production Example 4

A fluororesin film was manufactured in the same manner as in Production Example 3 with the exception that the amount of the synthetic mica used was changed to 3 parts by mass based on 100 parts by mass of the fluororesin.

Production Example 5

A fluororesin film whose surface was of a mirror surface type was manufactured in the same manner as in Production Example 1 with the exception that no surface-embossed back roll was used at the time of molding.

Production Example 6

A surface-embossed fluororesin film having a thickness of 100 μm was manufactured in the same manner as in Production Example 1 with the exception that the take-over speed was changed to 5 m/min.

Production Example 7

A fluororesin film was manufactured in the same manner as in Production Example 3 with the exception that the amount of the synthetic mica used was changed to 1 part by mass based on 100 parts by mass of the fluororesin.

Production Example 8

A fluororesin film (film thickness: 80 μm) was manufactured in the same manner as in Production Example 5 with the exception that a flat-shaped pigment (an amorphous silica-cerium oxide-silica composite, manufactured by Daito Kasei Co., Ltd., product name: Ceriguard T-3018-02) was used in an amount of 3 parts by mass based on 100 parts of the fluororesin, in place of the synthetic mica.

Production Example 9

A fluororesin film was manufactured in the same manner as in Production Example 5 with the exception that a Li—Al lamellar compound was used in an amount of 3 parts by mass based on 100 parts of the fluororesin, in place of the synthetic mica.

Production Example 10

A fluororesin film was manufactured in the same manner as in Production Example 5 with the exception that zinc oxide-silica composite fine particles was used in an amount of 1.7 parts by mass based on 100 parts of the fluororesin, in place of the synthetic mica.

Production Example 11

A surface-embossed mica-containing film having a thickness of 80 μm was manufactured in the same manner as in Production Example 2 with the exception that the synthetic mica was used in an amount of 3 parts by mass based on 100 parts by mass of the fluororesin.

For the fluororesin films obtained in Production Examples 1 to 11, there were measured the film thickness, the total light transmittance, the parallel light transmittance, the haze (opacity), the outgoing distributions of transmitted light (distributions of 0 to 0.5°, 1 to 10°, 5.5 to 10° and 30° or larger) and the surface roughness. The results thereof are shown in Table 1. The content of the light-scattering agent in Table 1 is a content based on 100 parts by mass of the fluororesin. Further, "composite fine particles" in Table 1 mean zinc oxide-silica composite fine particles. Furthermore, the outgoing distributions of the light transmitted through the films are shown in FIG. 1.

TABLE 1

| | | Prod. Ex. 1 | Prod. Ex. 2 | Prod. Ex. 3 | Prod. Ex. 4 | Prod. Ex. 5 | Prod. Ex. 6 | Prod. Ex. 7 | Prod. Ex. 8 | Prod. Ex. 9 | Prod. Ex. 10 | Prod. Ex. 11 |
|---|---|---|---|---|---|---|---|---|---|---|---|---|
| Film Thickness [μm] | | 100 | 100 | 80 | 80 | 100 | 100 | 80 | 80 | 100 | 100 | 80 |
| Content of Light-Scattering Agent [parts by mass] | Synthetic Mica | — | — | 5 | 3 | — | — | 1 | — | — | — | 3 |
| | Flat-Shaped Pigment | — | — | — | — | — | — | — | 3 | — | — | — |
| | Lamellar Compound | — | — | — | — | — | — | — | — | 3 | — | — |
| | Composite Fine Particles | — | — | — | — | — | — | — | — | — | 3 | — |
| Light | Total Light | 94.6 | 94.6 | 89.8 | 91.6 | 94.5 | 94.5 | 92.7 | 89.2 | 93.6 | 87.3 | 92.9 |

TABLE 1-continued

|  |  |  | Prod. Ex. 1 | Prod. Ex. 2 | Prod. Ex. 3 | Prod. Ex. 4 | Prod. Ex. 5 | Prod. Ex. 6 | Prod. Ex. 7 | Prod. Ex. 8 | Prod. Ex. 9 | Prod. Ex. 10 | Prod. Ex. 11 |
|---|---|---|---|---|---|---|---|---|---|---|---|---|---|
| Transmittance [%] | Parallel Light | | 12.8 | 32.8 | 23.3 | 36.2 | 90.1 | 42.1 | 67.3 | 60.6 | 43.4 | 39.3 | 16.4 |
| | Haze [%] | | 74.5 | 60.2 | 74.0 | 60.4 | 5.0 | 45.5 | 27.3 | 32.0 | 53.6 | 54.9 | 82.2 |
| Outgoing Distribution of Transmitted Light [%] | | 0-0.5° | 15.7 | 23.5 | 22.5 | 37.8 | 87.2 | 60.3 | 60.0 | 62.3 | 72.0 | 70.8 | 12.0 |
| | | 1-10° | 76.9 | 75.7 | 67.9 | 60.1 | 12.8 | 39.7 | 39.8 | 37.7 | 28.0 | 29.2 | 80.5 |
| | | 5.5-10° | 22.6 | 12.5 | 16.9 | 6.9 | 0.0 | 0.0 | 1.7 | 0.1 | 0.1 | 0.0 | 25.1 |
| | | >30° | 0.04 | 0.00 | 0.31 | 0.00 | 0.00 | 0.00 | 0.00 | 0.00 | 0.00 | 0.00 | 0.10 |
| Surface Roughness [μm] | MD Direction | Ra | 2.19 | 1.88 | 0.32 | 0.37 | 0.04 | 1.41 | 0.21 | 0.10 | 0.10 | 0.06 | 1.88 |
| | | Rz | 20.80 | 16.17 | 3.86 | 4.09 | 0.51 | 12.05 | 2.58 | 1.39 | 0.67 | 0.59 | 9.10 |
| | | Sm | 77.66 | 66.66 | 70.79 | 101.20 | 39.99 | 87.91 | 159.90 | 363.60 | 3999.00 | 3999.00 | 128.00 |
| | TD Direction | Ra | 2.24 | 1.91 | 0.35 | 0.44 | 0.06 | 1.53 | 0.36 | 0.10 | 0.12 | 0.08 | 1.95 |
| | | Rz | 22.63 | 16.74 | 4.34 | 4.89 | 0.51 | 11.60 | 5.01 | 1.48 | 0.87 | 0.68 | 9.38 |
| | | Sm | 87.91 | 80.80 | 82.47 | 114.20 | 39.99 | 105.20 | 228.50 | 3.32 | 3999.00 | 3999.00 | 134.20 |

Reference Examples 1 to 3

As existing light-scattering agricultural films, for respective films of Pearl Mate-Agricultural Polyolefin (manufactured by C. I Kasei Co., Ltd.) (Reference Example 1), Pearl Mate-Agricultural Vinyl (manufactured by C. I Kasei Co., Ltd.) (Reference Example 2), and Soft Solar (manufactured by Mikado Kako Co., Ltd.) (Reference Example 3) which are all sold in the market, there were measured the total light transmittance, the parallel light transmittance, the haze (opacity), the outgoing distributions of transmitted light (distributions of 0 to 0.5°, 1 to 10°, 5.5 to 10° and 30° or larger) and the surface roughness, in the same manner as in Production Examples 1 to 10. The results thereof are shown in Table 2. Further, the outgoing distributions of the light transmitted through the films are shown in FIG. 1.

TABLE 2

|  |  |  | Reference Ex. 1 | Reference Ex. 2 | Reference Ex. 3 |
|---|---|---|---|---|---|
| Film Thickness [μm] | | | 150 | 60 | 140 |
| Light Transmittance [%] | Total Light | | 89.8 | 90.6 | 90.4 |
| | Parallel Light | | 62.0 | 55.0 | 64.1 |
| Haze [%] | | | 31.0 | 39.3 | 29.0 |
| Outgoing Distribution of Transmitted Light [%] | | 0-0.5° | 55.4 | 47.6 | 63.6 |
| | | 1-10° | 42.9 | 50.9 | 35.6 |
| | | 5.5-10° | 1.9 | 2.2 | 1.2 |
| | | >30° | 0.00 | 0.00 | 0.00 |
| Surface Roughness [μm] | MD Direction | Ra | 0.28 | 0.65 | 0.44 |
| | | Rz | 3.31 | 5.41 | 5.47 |
| | | Sm | 159.9 | 166.6 | 129.0 |
| | TD Direction | Ra | 0.33 | 0.74 | 0.52 |
| | | Rz | 3.75 | 7.68 | 7.08 |
| | | Sm | 296.2 | 156.8 | 166.6 |

As shown in Table 1 and FIG. 1, in the fluororesin films of Production Examples 1 and 2 in which the Ra of film surface was adjusted to 1.6 vim or larger, the ratio of scattered light with a scattering angle of 5.5 to 10° was 5% or higher, and the ratio of scattered light with a scattering angle of 1 to 10° was 50% or higher.

Further, in the fluororesin films of Production Examples 3, 4 and 11 in which the synthetic mica was allowed to be contained, the ratio of scattered light with a scattering angle of 0 to 0.5° was decreased, and further, the ratio of scattered light with a scattering angle of 1 to 10° was improved. The ratio of scattered light with a scattering angle of 1 to 10° was 50% or higher, and the ratio of scattered light with a scattering angle of 5.5 to 10° was 5% or higher.

On the other hand, in the fluororesin film of Production Example 5 which is a clear film in which the Ra of the film surface was smaller than 1.6 μm and the surface was of a mirror surface type, the ratio of scattered light with a scattering angle of 0 to 0.5° was high, further, the ratio of scattered light with a scattering angle of 1 to 10° was 50% or lower, the light transmitted through the film was scarcely scattered, and the ratio of scattered light with a scattering angle of 5.5 to 10° was 0%. Similarly, also in the fluororesin film of Production Example 6 in which the Ra of the film surface was adjusted to smaller than 1.6 vim, the light transmitted through the film was not scattered so much, and the ratio of scattered light with a scattering angle of 5.5 to 10° was 0%.

Further, also in Production Example 7 in which the content of the synthetic mica is small and Production Example 8 in which the flat-shaped pigment was used, the light transmitted through the films was not scattered so much, and the ratio of scattered light with a scattering angle of 5.5 to 10° was as low as 1.7% and 0.1%, respectively.

Furthermore, in Production Examples 9 and 10 in which the Li—Al lamellar compound and the zinc oxide-silica composite fine particles were each used, the ratio of scattered light with a scattering angle of 0 to 0.5° was high, and the ratio of scattered light with a scattering angle of 1 to 10° was 50% or higher. However, the ratio of scattered light with a scattering angle of 5.5 to 10° was appropriately 0%.

In addition, as shown in Table 2 and FIG. 1, in the existing agricultural films of Reference Examples 1 to 3 sold in the market, the ratio of scattered light with a scattering angle of 0 to 0.5° was high, and there was an example where the ratio of scattered light with a scattering angle of 1 to 10° was higher than 50%. However, the ratio of scattered light with a scattering angle of 5.5 to 10° was low.

<Cultivation of Crops in House>

In order to study the influence of scattered light having a specific scattering angle on cultivation of crops, cultivation of strawberries and cucumbers in house was performed using the fluororesin films obtained in Production Examples 1 to 11 and the agricultural films of Reference Examples 1 to 3. Evaluation of the cultivation using the respective fluororesin films was made as described below.

[Yield of Strawberries]

The yield of the respective strawberries cultivated in Examples and Comparative Examples was researched by measuring the fruit weight (t) of the strawberries harvested per 10 a (ares).

[Sugar Content of Strawberries]

The sugar content (Brix, unit: %) of the strawberries obtained in Examples and Comparative Examples was measured with a digital sugar content meter (refractometer).

Atago Refractometer PR-1 (manufactured by Atago Co., Ltd.) was used as the instrument.

[Occurrence Frequency of Seedling Blight of Cucumbers]

In the cultivation of the cucumbers, 10 pots were used for each Example, and the occurrence of seedling blight of each pot was visually observed, and evaluated according the following criteria:

A: The number of pots in which seedling blight has occurred is 0.

B: The number of pots in which seedling blight has occurred is 1 to 3.

C: The number of pots in which seedling blight has occurred is 4 to 7.

D: The number of pots in which seedling blight has occurred is 8 or more.

Example 1

The fluororesin film obtained in Production Example 1 was subjected to corona discharge treatment, and an agent for flowing water droplets was applied thereto to a thickness of about 0.2 μm. An agricultural roof type house was covered with the film, and strawberries were cultivated therein.

Four ridges of 130 cm wide and 10.5 m long were formed in the house, and 45 roots×2 rows per ridge of strawberry "Sachinoka" were planted at a planting interval of 20 cm. As for conditions of compost and basal fertilizer, bark compost was 4 t per 10 a, CDU chemical lime was 10 kg per 1 a as a nitrogen component, and magnesium lime was 120 kg per 10 a. Cultivation was performed without heating during the cultivation period. The research time of the yield was from 23, January to 26, March, and the research time of the sugar content was from 23, January to 12, April.

Further, cultivation of cucumbers was performed in the same house. Cucumber "Natsusuzumi" was seeded on 6, September, and transplanting into 9-cm pots in which propagation bark was placed was performed on 11, September. Then, the 10 raising seedling pots were put in the house to perform the cultivation. A material for intercepting sunlight, such as a cheese cloth, was not provided in the house, and the cultivation period was from 11, September to 23, September.

Examples 2 to 5

Strawberries and cucumbers were cultivated in the same manner as in Example 1 with the exception that fluororesin films used were changed as shown in Table 3.

Comparative Examples 1 to 9

Strawberries and cucumbers were cultivated in the same manner as in Example 1 with the exception that fluororesin films used were changed as shown in Table 3.

The research results of the yield and sugar content of the strawberries and the occurrence frequency of seedling blight of the cucumbers in Examples 1 to 5 and Comparative Examples 1 to 9 are shown in Table 3. Further, in Table 3, taking the yield and sugar content of the strawberries in Comparative Example 1 as 100%, the ratios of those in Examples and Comparative Examples to those in Comparative Example 1 are shown.

TABLE 3

| | | Strawberry Cultivation Results | | | | Cucumber Cultivation Results |
|---|---|---|---|---|---|---|
| | | Fruit Weight | | Sugar content | | Occurrence |
| | Fluororesin Film Used | Total Yield (t/10 a) | To Prod. Ex. 5 (%) | Sugar Content (BX.: %) | To Prod. Ex. 5 (%) | Frequency of Seedling Blight |
| Ex. 1 | Prod. Ex. 1 | 1.6 | 123 | 10.40 | 112 | A |
| Ex. 2 | Prod. Ex. 2 | 1.46 | 112 | 9.82 | 106 | B |
| Ex. 3 | Prod. Ex. 3 | 1.57 | 121 | 10.30 | 111 | A |
| Ex. 4 | Prod. Ex. 4 | 1.45 | 112 | 9.81 | 105 | B |
| Comp. Ex. 1 | Prod. Ex. 5 | 1.3 | 100 | 9.30 | 100 | D |
| Comp. Ex. 2 | Prod. Ex. 6 | 1.35 | 104 | 9.45 | 102 | C |
| Comp. Ex. 3 | Prod. Ex. 7 | 1.35 | 104 | 9.41 | 101 | C |
| Comp. Ex. 4 | Prod. Ex. 8 | 1.33 | 102 | 9.34 | 100 | C |
| Comp. Ex. 5 | Prod. Ex. 9 | 1.31 | 101 | 9.3 | 100 | D |
| Comp. Ex. 6 | Prod. Ex. 10 | 1.31 | 101 | 9.3 | 100 | D |
| Ex. 5 | Prod. Ex. 11 | 1.58 | 123 | 10.35 | 111 | A |
| Comp. Ex. 7 | Ref. Ex. 1 | 1.32 | 102 | 9.27 | 100 | C |
| Comp. Ex. 8 | Ref. Ex. 2 | 1.35 | 104 | 9.32 | 100 | C |
| Comp. Ex. 9 | Ref. Ex. 3 | 1.31 | 101 | 9.31 | 100 | D |

As shown in Table 3, in the cultivation of the strawberries in Examples 1, 3 and 5, the yield of the strawberries was about 20% increased and the sugar content was about 10% elevated, compared to those in Comparative Example 1 in which the fluororesin film of Production Example 5 as a clear film whose surface was of a mirror surface type was used. In Examples 2 and 4, the yield of the strawberries was about 10% increased and the sugar content was about 5% elevated, compared to those in Comparative Example 1. Further, in Examples 1 to 5, the strawberries cultivated were better in coloring than the strawberries cultivated in Comparative Examples.

On the other hand, in Comparative Examples 2 to 9, the yield and sugar content of the strawberries were not so different from the cultivation results in Comparative Example 1.

It was judged that these results were obtained because in Examples 1 to 5 the light transmitted through the film was scattered to increase the ratio of the light with a scattering angle of 5.5 to 10° to 5% or higher, thereby enhancing photosynthesis of the strawberries.

In the cultivation of the cucumbers in Examples 1, 3 and 5, no seedling blight occurred at all, and in Examples 2 and 4, seedling blight scarcely occurred. Further, the shadows of the frames were not formed in the house, and the seedlings of uniform height grew well independently of the place where the seedlings were cultivated.

On the other hand, in Comparative Examples 1 to 9, seedling blight occurred in many pots.

It was judged that these results were obtained because in Examples 1 to 5 the light transmitted through the film was scattered to increase the ratio of the light with a scattering angle of 5.5 to 10° to 5% or higher, thereby sufficiently softening the light in the house.

As described above, according to the fluororesin film of the present invention, the amount of direct sunlight causing leaf scorch of crops is decreased, the light in the house is softened by the scattered light, and the shadows of the frames and the like become difficult to be formed, whereby poor growth of the crops becomes difficult to occur. Further, the light becomes uniformly reachable to the whole plants by using the fluororesin film of the present invention, so that the efficiency of photosynthesis is improved not only to improve the growth of the crops but also to be able to contribute the cultivation of high-grade excellent crops. Furthermore, by adjusting the ratio of light with a scattering angel of 30° or larger to 1% or lower, the light which has entered in the inside of the house by scattering is inhibited from going out as it is, so that the light transmitted through the film is efficiently used for photosynthesis.

While the invention has been described in detail with reference to specific embodiments thereof, it will be apparent to one skilled in the art that various changes and modifications can be made therein without departing from the spirit and scope thereof.

The present application is based on Japanese Patent Application No. 2008-271050 filed on Oct. 21, 2008, and the contents are incorporated herein by reference.

Industrial Applicability

The fluororesin film of the present invention can reduce the occurrence of leaf scorch, seedling blight or the like, and can cultivate crops excellent in uniformity of color or sugar content. Therefore, it can be used for horticultural houses, agricultural houses or the like.

The invention claimed is:

1. A light-scattering fluororesin film for agricultural applications that gives a ratio of scattered light with a scattering angle of 5.5 to 10° being 5% or higher relative to the total transmitted light.

2. The light-scattering fluororesin film for agricultural applications according to claim 1 that gives a ratio of scattered light with a scattering angle of 1 to 10° being 50% or higher relative to the total transmitted light.

3. The light-scattering fluororesin film for agricultural applications according to claim 1 that gives a ratio of scattered light with a scattering angle of 30° or larger being 1% or lower relative to the total transmitted light.

4. The light-scattering fluororesin film for agricultural applications according to claim 1, wherein the fluororesin film has concaves and convexes on a surface thereof, and has a surface roughness thereof represented by the arithmetic average roughness Ra of from 1.6 μm to 3 μm, in both the TD direction (width direction) and the MD direction (flow direction).

5. The light-scattering fluororesin film for agricultural applications according to claim 1, wherein the fluororesin film has concaves and convexes on a surface thereof, and has a surface roughness thereof represented by the 10-point average roughness Rz of from 13 to 25 μm, in both the TD direction and the MD direction.

6. The light-scattering fluororesin film for agricultural applications according to claim 1, wherein the fluororesin film has concaves and convexes on a surface thereof, and has an average distance Sm among the concaves and the convexes of from 40 to 100 μm, in both the MD direction and the TD direction.

7. The light-scattering fluororesin film for agricultural applications according to claim 1, wherein the fluororesin film contains synthetic mica particles having an average particle size of 3 to 15 μm, and the content thereof is from 3 to 5 parts by mass based on 100 parts by mass of the fluororesin.

8. The light-scattering fluororesin film for agricultural applications according to claim 1, wherein the ratio of scattered light with a scattering angle of 5.5 to 10° is 10% to 40% relative to the total transmitted light.

9. The light-scattering fluororesin film for agricultural applications according to claim 1, wherein the ratio of scattered light with a scattering angle of 5.5 to 10° is 20% to 40% relative to the total transmitted light.

10. The light-scattering fluororesin film for agricultural applications according to claim 2, wherein the ratio of scattered light with a scattering angle of 1 to 10° is 60% to 90% relative to the total transmitted light.

11. The light-scattering fluororesin film for agricultural applications according to claim 2, wherein the ratio of scattered light with a scattering angle of 1 to 10° is 70% to 90% relative to the total transmitted light.

12. The light-scattering fluororesin film for agricultural applications according to claim 1, that gives a ratio of scattered light with a scattering angle of 0 to 0.5° of 40% or lower relative to the total transmitted light.

13. The light-scattering fluororesin film for agricultural applications according to claim 12, that gives a ratio of scattered light with a scattering angle of 0 to 0.5° of 30% or lower relative to the total transmitted light.

14. The light-scattering fluororesin film for agricultural applications according to claim 4, wherein the surface roughness Ra is from 1.7 μm to 3 μm.

15. The light-scattering fluororesin film for agricultural applications according to claim 4, wherein the surface roughness Ra is from 1.8 μm to 2.5 μm.

16. The light-scattering fluororesin film for agricultural applications according to claim 5, wherein Rz is from 15 to 25 μm.

17. The light-scattering fluororesin film for agricultural applications according to claim 5, wherein Rz is from 18 to 22 μm.

18. The light-scattering fluororesin film for agricultural applications according to claim 6, wherein Sm is from 50 to 95 μm.

19. The light-scattering fluororesin film for agricultural applications according to claim 6, wherein Sm is from 60 to 90 μm.

* * * * *